C. M. WEBB.
VEHICLE SEAT.
APPLICATION FILED AUG. 13, 1918.
1,297,947.
Patented Mar. 18, 1919
2 SHEETS—SHEET 1.
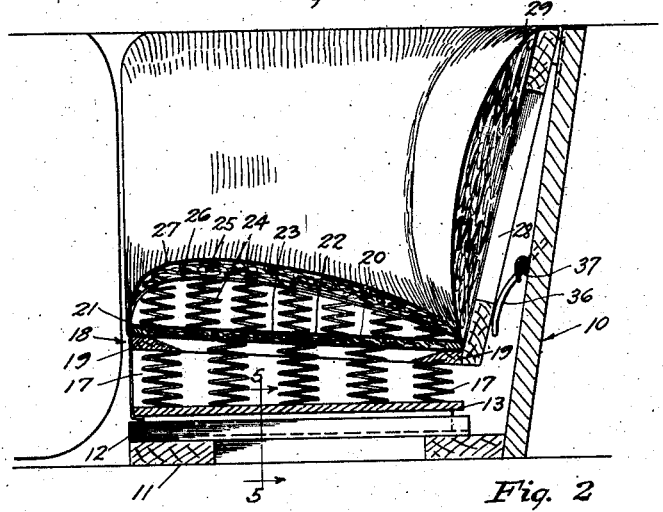
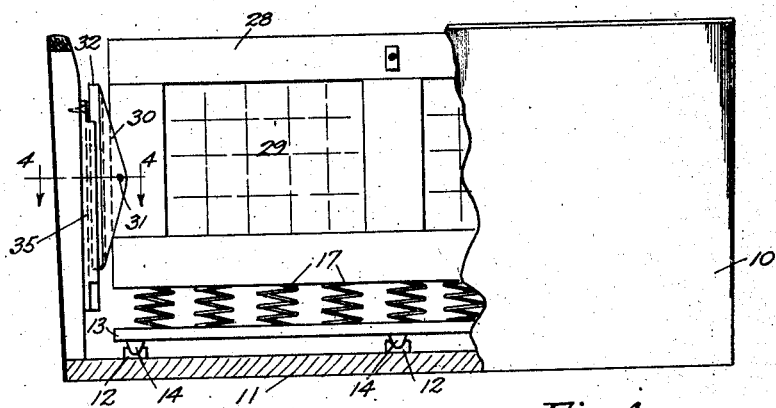
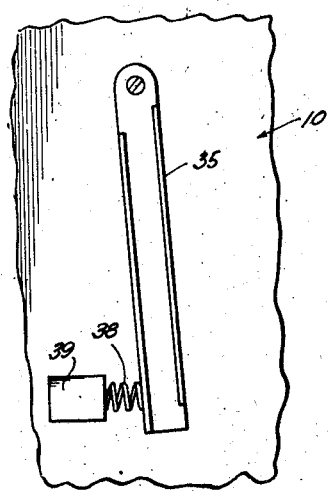
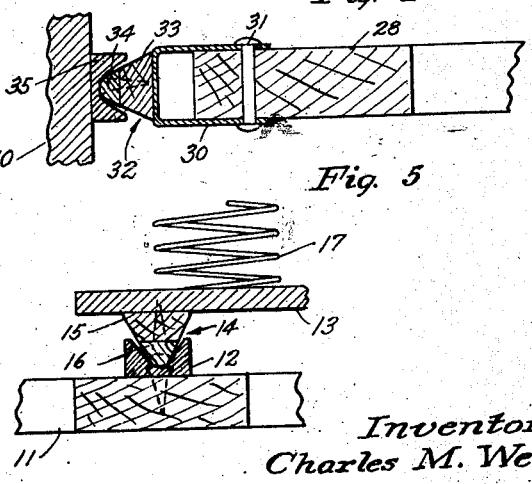
Inventor
Charles M. Webb
by Westall and Wallace
his Attorneys C. M. WEBB.
VEHICLE SEAT.
APPLICATION FILED AUG. 13, 1918.
1,297,947.
Patented Mar. 18, 1919.
2 SHEETS—SHEET 2.
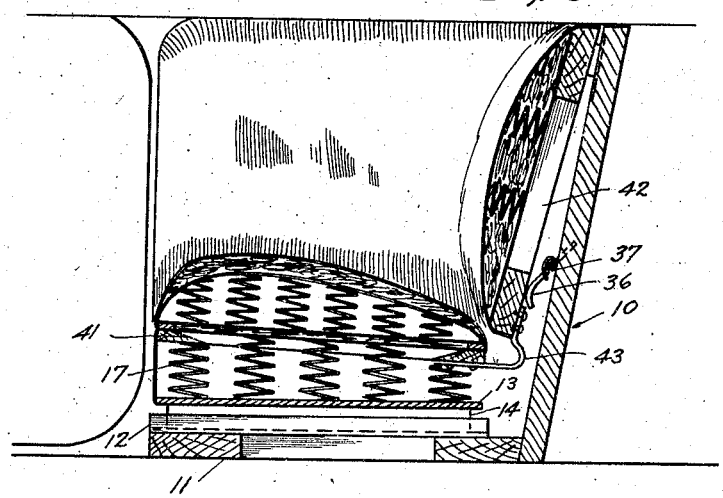
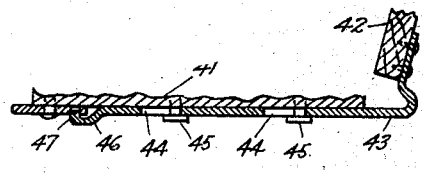
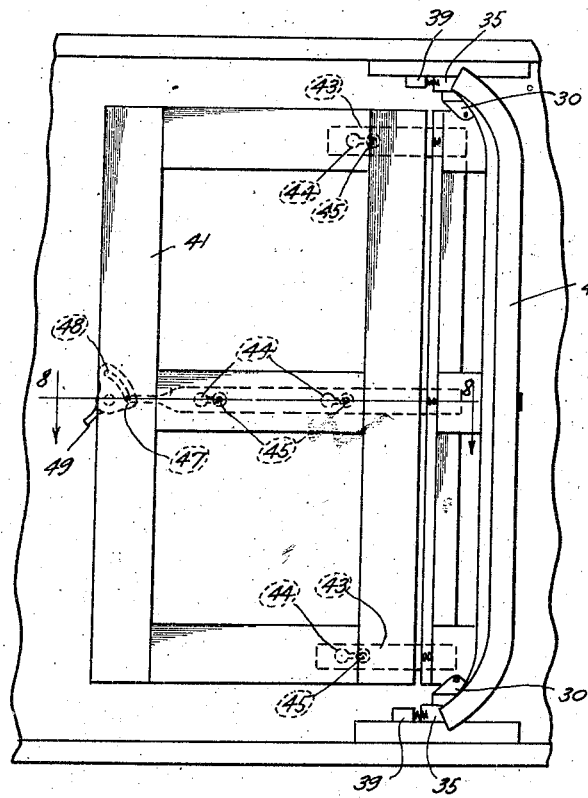
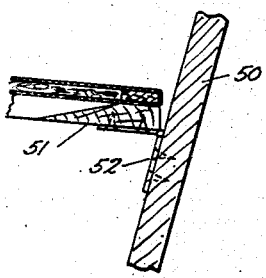
Inventor
Charles M. Webb
by Nestall and Wallace
his Attorneys

UNITED STATES PATENT OFFICE.

CHARLES M. WEBB, OF LOS ANGELES, CALIFORNIA.

VEHICLE-SEAT.

1,297,947.  Specification of Letters Patent.  Patented Mar. 18, 1919.

Application filed August 13, 1918. Serial No. 249,674.

*To all whom it may concern:*

Be it known that I, CHARLES M. WEBB, a citizen of the United States, residing at Los Angeles, in the county of Los Angeles and State of California, have invented new and useful Improvements in Vehicle-Seats, of which the following is a specification.

This invention relates to a vehicle seat having back and seat portions acting as a unit and supported to move in a floating manner with respect to the vehicle body.

Heretofore, it has been the general custom to fasten the back and seat cushions of automobiles to the seat frame, so that the road shocks cause up and down vibrations of the passenger on the seat cushion. The back cushion being fastened to the car moves up and down with the latter, but not with the passenger whose back frictionally engages the back cushion causing discomfort. It has been proposed to provide a seat having a seat cushion and a back cushion which move together in unison, and this invention pertains to such a seat construction.

The primary object of this invention is to provide a seat whose seat cushion and back cushion are not only supported to move upwardly and downwardly in unison, but are also supported to move forwardly and backwardly to accommodate the passenger to shock in the line of travel of the car.

Another object of this invention is to provide a seat, which may tip laterally so as to accommodate it to uneven loading by reason of passengers of different weights occupying opposite sides, or a less number of passengers than the seat was designed for occupying one end. This results in any number of passengers riding comfortably regardless of their weight and position upon the seat.

Other objects of this invention are, to provide a construction, which is simple and may be embodied within the design of vehicle bodies without material alteration or radical change thereof; and to provide a seat mounted so that it can be easily and expeditiously removed and replaced in the body.

I accomplish these objects by means of the embodiments of my invention illustrated in the accompanying drawing, in which:

Figure 1 is a transverse view in section through one embodiment of my invention disclosing the mounting. Fig. 2 is a rear elevation of the supporting frame partly in section showing the construction illustrated in Fig. 1. Fig. 3 is an enlarged fragmentary view illustrating one of the guides by which the seat is secured and a spring stop against which it abuts. Fig. 4 is an enlarged section as seen on the line 4—4 of Fig. 2. Fig. 5 is an enlarged section as seen on the line 5—5 of Fig. 1. Fig. 6 is a transverse section through a modified form of seat. Fig. 7 is a view in plan illustrating the seat frame shown in Fig. 6. Fig. 8 is a section as seen on the line 8—8 of Fig. 7. Fig. 9 is a fragmentary view illustrating a modified form of the connection between the seat and back, whereby the two members are hinged to each other.

Referring more particularly to Figs. 1 to 5 inclusive, the supporting frame for the seat is indicated by 10, and comprises a seat box 11, which is built up from the floor of a vehicle body and is rectangular in shape. Mounted upon the top frame members of box 11 are channel irons 12, which serve as guide tracks. The tracks are disposed at the opposite ends and across the middle of the seat box in parallel relation to each other. A spring frame 13 is mounted above the box and is supported in sliding relation upon the guide tracks by means of guide bars 14. The guide bars are built up as shown in Fig. 5 of wooden strips 15 secured to the spring frame 13 and fiber strips 16 secured to the under side of the wooden strips. The fiber strips 16 fit slidingly within the channels in the guide track. This construction provides for the sliding movement of the seat backward and forward with relation to the body of the vehicle, rendering lubrication unnecessary and eliminating all noise and squeaking. Coil springs 17 are mounted upon the spring frame and support a rectangular seat frame 18. This frame is separate from the springs 17 and their frame and merely rests thereupon.

The border pieces 19 of the seat frame are beveled upon the inner faces as indicated in Fig. 1. Tacked to the border pieces 19 is a webbing 20. Mounted on top of the webbing 20 and secured to the pieces 19 are strips 21. Secured upon the top of strips 21 is a webbing 22. Disposed between webbings 20 and 22 is a layer of upholstering 23 formed of hair or any other suitable material. Disposed upon the upper webbing 22 are seat springs 24, which in turn support a covering consisting of a layer of upholstering 25 disposed between two thicknesses of fabric 26 and 27. The edges of these fabric pieces are brought down over the sides of the seat frame 18 to conceal the latter and properly finish the seat. A weight placed upon the seat will cause depression of springs 24 which rest upon the webbing 22. The pressure upon webbing 22 causes the latter to sag downwardly and with it webbing 20 and upholstering 23. The beveled faces of the border pieces 19 prevent the webbing from being cut. As the webbing sags downwardly, it reaches and rests upon the springs 17. By this arrangement the cushioning action of both sets of springs and the upholstering between the webbings and covering combine in supporting the weight of the occupant of the seat.

Secured along the rear edge of the seat frame 18 is a back frame 28. This frame, as shown in Fig. 1, is rigidly fastened to the seat frame in any suitable manner. The back cushion 29 is built up on the frame in any well known manner. Secured to each of the end pieces of the back frame are rockers. Referring to Figs. 2 and 4, rocker 30 is of channel form and secured to the frame by means of a pivot pin 31. Secured to the outer face of the rocker is a guide bar 32. The guide bar is built up of a wooden strip 33 secured to the rocker, and has mounted thereon a fiber strip 34. Pivotally secured to the side of the supporting frame are guide channels 35, best shown mounted in the channel of the guide 35. in Fig. 3. The fiber strips 34 are slidably This provides for movement of the seat and back frame forwardly and backwardly, and permits the back frame to move upwardly, and downwardly. The rockers 30 permit the seat to tip laterally without disalining the guide bars 32 and channels 35, or causing jamming of the bars in the guides. In order to maintain the back in normal position, arms 36 are pivoted to the back of the supporting frame and pressed forwardly against the seat back by means of coil springs 37. Fiber wear plates may be mounted on the back for arms 36 to ride thereon. The forward movement of the seat is accommodated by the track channels 12 and guide bars 14. This movement is limited, however, by a spring 38 mounted within a casing 39, and so disposed that the spring 38 is in contact with the pivoted arm 35. Spring 38 counteracts and resists the action of arm 36. The seat is thus held resiliently against forward and backward movement. Movement toward the rear is limited and cushioned by spring arm 36, and movement toward the front is limited and cushioned by spring 38.

Referring particularly to Figs. 6, 7 and 8, the supporting frame 10, seat box 11, spring frame 13, horizontal guide tracks and sliding bars, and springs 17 are the same as heretofore described. The seat frame 41 is rectangular in form, and has built up thereon the seat cushion in the same manner as the construction shown in Fig. 1. The back frame 42 with its back cushion is also the same as shown in Fig. 1, and the back frame is guided by the structure heretofore described. However, the seat frame 41 and back frame 42 are yieldably connected by spring brackets 43. The upper arms of the brackets are bolted to the back frame and the lower arms are formed with key slots 44 extending longitudinally along the arms. These slots are adapted to receive lock pins 45, which are secured to the bottom of the seat frame 41, and extend downwardly so that their enlarged heads may pass through the key slots and engage the shoulders formed by the reduced slot portions. The lower arm of the middle spring bracket extends the width of the seat frame and is offset at the forward end as indicated by 46. At the offset portion is a catch pin 47. This pin is adapted to register with an eccentric slot 48 formed in a locking cam 49. The cam 49 is pivoted to the under side of the key frame so that it may be swung to draw the seat and back frame together. When the seat frame is in the position shown in Figs. 7 and 8, the seat and back will be locked together and will operate as though they were firmly bolted to the spring bracket. If it is desired to permanently fasten the seat and back, both arms of the spring brackets 43 may be rigidly secured to the frame members.

The sectional view in Fig. 9 illustrates another form of connection between the seat frame and back frame. In this construction, the back frame 50 is secured to the seat frame 51 by means of hinges 52, which permit a slight movement between the two.

In operation, the seat may be occupied by one or two persons. The weight of the persons will act first to compress the springs 24 and then to stretch the webbing 20 and 22 downwardly. As the webbing is fastened to the frame 18, the weight is transferred by the frame to some of the springs 17. As the webbing sags downwardly it reaches and is supported upon other of the springs 17. The seat cushion accommodates itself to the body of the passenger, while the springs 17 take up the greater part of the road shock. In case the vehicle encounters a bump or stops suddenly, the seat will slide forwardly upon the seat box 11. As this action takes place the channel guides 35 will swing along the channels. Forward movement of the seat is resisted and limited by the springs 38. By this means the entire seat will move forwardly, and will not cause the occupant to slide over the cushions as it is common with rigidly held seats. Sudden starting causes the seat to slide backwardly against the action of spring arms 36. Vertical movement of the seat will be effected as a unit, the seat being resiliently supported upon the springs 17.

The operation of the form of seat shown in Figs. 6 to 8 is identical with the device just described. In addition, the back frame and seat frame have a slight folding movement due to their connection by the spring brackets. A similar operation is obtained with the use of the connection shown in Fig. 9.

If the seat is unevenly loaded, one side will be depressed more than the other. This causes the seat to tip laterally. The rockers swing on their pivots to accommodate themselves to the inclination of the seat and at the same time maintain the alinement of the guide bars and guides. By this means jamming of the guide bars in the guide channels is prevented, and free and easy movement of the seat is maintained.

It will thus be seen that a seat embodying my invention will support one or more persons regardless of their position on the seat or differences in weight; that all road shocks are absorbed; that the back of the passenger does not slide up and down over the back of the seat, nor does he slide forward and backward over the seat cushion. The seat is supported so that it has substantially a universal movement with respect to the vehicle and is resiliently supported in its movement in any direction with respect to the vehicle.

This application is a continuation of my application for vehicle seats, August 27, 1917, Serial No. 188,467 as to all features shown herein except the rocker 30.

What I claim is:

1. In a vehicle seat, the combination of a seat comprising a back connected to move in unison therewith, a supporting frame, and rocking guide and slide connecting said seat to said frame so as to permit up and down movement and lateral tipping.

2. In a vehicle seat, the combination of a seat comprising a back connected so as to move in unison therewith, a supporting frame, and universal guide means connecting said seat to said frame so as to permit up and down, forward and backward movement, and lateral tipping.

3. In a vehicle seat, the combination of a seat comprising a back connected to move in unison therewith, a supporting frame, guides pivotally secured to said supporting frame, and followers secured to said seat and riding on said guides.

4. In a vehicle seat, the combination of a seat comprising a back connected to move in unison therewith, a supporting frame, guides pivotally secured to said supporting frame, followers connected to said seat so as to rock, whereby up and down, forward and backward movement, and lateral tipping of the seat is permitted.

5. In a vehicle seat the combination of a seat comprising a back connected to move in unison therewith, a supporting frame, guides pivotally secured to said supporting frame, followers secured to said seat and riding on said guides, and means slidably supporting said seat for forward and backward movement.

6. In a vehicle seat the combination of a seat comprising a back connected to move in unison therewith, a supporting frame, guides pivotally secured to said supporting frame, followers connected to said back so as to rock and ride on said guides, whereby up and down, forward and backward movement, and lateral tipping of the seat is permitted, and means slidably supporting said seat for forward and backward movement.

7. In a vehicle seat, the combination of a supporting frame, box springs mounted thereon, means whereby said springs may move horizontally in relation to said platform, a seat frame resiliently supported by said box spring, a back frame secured to said seat frame and adapted to move therewith, guide bars mounted upon the opposite sides of said back frame, channel guides along which said guide bars slide, said channel guides being secured to said supporting frame so as to permit forward and backward movement.

8. In a vehicle seat, the combination of a supporting frame, box springs mounted thereon, means whereby said springs may move horizontally in relation to said platform, a seat frame resiliently supported by said box spring, a back frame secured to said seat frame and adapted to move therewith, guide bars mounted upon the opposite sides of said back frame, channel guides along which said guide bars slide, said channel guides being secured to said supporting frame so as to permit forward and backward movement and resilient means adapted to limit the forward movement of said seat.

9. In a vehicle seat, the combination of a supporting frame, box springs mounted thereon, means whereby said springs may move horizontally, a seat frame resiliently supported by said box springs, a back frame secured to said seat frame and adapted to move therewith, guide bars mounted upon the opposite sides of said back frame, channel guides along which said guide bars slide, said channel guides being secured to said supporting frame so as to permit forward and backward movement, resilient means adapted to limit the forward movement of said seat, and resilient means adapted to cushion and limit the rearward movement of said seat.

10. In a vehicle seat, the combination of a supporting frame, box springs mounted thereon, means whereby said springs may move horizontally, a seat frame resiliently supported by said box springs, a back frame secured to said seat frame and adapted to move therewith, guide bars mounted to rock upon the opposite sides of said back frame, and channel guides along which said guide bars slide.

11. In a vehicle seat, the combination of a supporting frame, box springs mounted thereon, means whereby said springs may move horizontally, a seat frame resiliently supported by said box springs, a back frame secured to said seat frame and adapted to move therewith, guide bars mounted upon the opposite sides of said back frame, and channel guides pivotally mounted upon said supporting frame so as to permit forward and backward movement of said seat.

12. In a vehicle seat, the combination of a supporting frame, box springs mounted thereon, means whereby said springs may move horizontally, a seat frame resiliently supported by said box springs, a back frame secured to said seat frame, and adapted to move therewith, guide bars pivotally mounted on said back frame to permit lateral tipping of said seat, and channel guides pivotally mounted upon said supporting frame so as to permit forward and backward movement of said seat.

In witness that I claim the foregoing I have hereunto subscribed my name this 5th day of August, 1918.

CHARLES M. WEBB.